US006470335B1

(12) United States Patent
Marusak

(10) Patent No.: US 6,470,335 B1
(45) Date of Patent: Oct. 22, 2002

(54) SYSTEM AND METHOD FOR OPTIMIZING THE STRUCTURE AND DISPLAY OF COMPLEX DATA FILTERS

(75) Inventor: Scott M. Marusak, Cary, NC (US)

(73) Assignee: SAS Institute Inc., Cary, NC (US)

(*) Notice: Subject to any disclaimer, the term of this patent is extended or adjusted under 35 U.S.C. 154(b) by 162 days.

(21) Appl. No.: 09/585,079

(22) Filed: Jun. 1, 2000

(51) Int. Cl.[7] ............................................. G06F 17/30
(52) U.S. Cl. ......................... 707/4; 345/837; 345/853; 345/969
(58) Field of Search .................. 707/2, 10, 3–6, 707/104; 345/837, 853, 969

(56) References Cited

U.S. PATENT DOCUMENTS

| | | | |
|---|---|---|---|
| 4,769,772 A | | 9/1988 | Dwyer |
| 5,091,852 A | | 2/1992 | Tsuchida et al. |
| 5,367,675 A | | 11/1994 | Cheng et al. |
| 5,418,950 A | | 5/1995 | Li et al. |
| 5,421,008 A | | 5/1995 | Banning et al. |
| 5,495,605 A | | 2/1996 | Cadot |
| 5,548,755 A | | 8/1996 | Leung et al. |
| 5,615,361 A | | 3/1997 | Leung et al. |
| 5,659,728 A | | 8/1997 | Bhargava et al. |
| 5,668,966 A | | 9/1997 | Ono et al. |
| 5,668,987 A | | 9/1997 | Schneider |
| 5,696,960 A | | 12/1997 | Bhargava et al. |
| 5,713,020 A | * | 1/1998 | Reiter et al. ................. 345/804 |
| 5,724,570 A | | 3/1998 | Zeller et al. |
| 5,761,657 A | | 6/1998 | Hoang |
| 5,819,255 A | * | 10/1998 | Celis et al. |
| 5,822,747 A | * | 10/1998 | Graefe et al. |
| 5,822,750 A | | 10/1998 | Jou et al. |
| 5,855,012 A | | 12/1998 | Bhargava et al. |
| 5,864,840 A | * | 1/1999 | Leung |
| 5,913,205 A | * | 6/1999 | Jain et al. |
| 5,937,401 A | | 8/1999 | Hillegas |
| 5,960,427 A | | 9/1999 | Goel et al. |
| 5,966,126 A | | 10/1999 | Szabo |
| 6,021,405 A | * | 2/2000 | Celis et al. |
| 6,032,143 A | * | 2/2000 | Leung et al. |
| 6,229,538 B1 | * | 5/2001 | McIntyre et al. ........... 345/734 |
| 6,275,801 B1 | * | 8/2001 | Novak et al. ................ 704/252 |
| 6,275,818 B1 | * | 8/2001 | Subramanian et al. |
| 6,295,517 B1 | * | 9/2001 | Roy et al. ..................... 703/15 |
| 6,362,836 B1 | * | 3/2002 | Shaw et al. .................. 345/744 |

\* cited by examiner

*Primary Examiner*—Safet Metjahic
*Assistant Examiner*—Haythim Alaubaidi
(74) *Attorney, Agent, or Firm*—Jones, Day, Reavis & Pogue

(57) ABSTRACT

A system and method for optimizing the structure and display of complex data filters is provided. The system includes software modules for creating, optimizing and then displaying complex data filter queries structured according to a particular query language. The query is modeled by generating a filter network comprising a plurality of filter nodes, wherein each filter node corresponds to a conditional expression in the query. Optimization modules then optimize the structure and visual display of the filter network. The system software modules may include a query input module, a graphical interface module, a visual optimization module, and a query language optimization module. The query input module enables a user to input a data filter query into the system using a particular query language. The graphical interface module then maps the input query into a graphical representation of the data filter using a readily understandable graphical paradigm. The visual optimization module optimizes the graphical display of the query by merging sub-networks of the filter network that generate the same query language, and the query language optimization module optimizes the structure of the input query by eliminating redundant filter nodes.

35 Claims, 12 Drawing Sheets

BECOMES

SYSTEM AND METHOD FOR OPTIMIZING THE STRUCTURE AND DISPLAY OF COMPLEX DATA FILTERS

BACKGROUND OF THE INVENTION

1. Technical Field

The present invention is directed to the field of database queries. More specifically, the invention provides a system and method for optimizing the structure and visual display of complex data filters that are used to query a database.

2. Description of the Related Art

There are many known software systems and methods for querying a database. One of the most popular software query languages is known as SQL (or Structured Query Language.) SQL provides a framework for logically structuring complex conditional expressions that can be used to query a database. SQL includes many different types of logical constructs, including the WHERE clause, the HAVING clause and the ON clause. A WHERE clause is typically structured as follows: WHERE (variable 1 <operator> condition 1) link (variable 2 <operator> condition 2). The WHERE clause then returns data records from the database that meet the two conditional expressions (variable 1 <operator> condition 2) link (variable 2 <operator> condition 2), depending on the type of link. Two common forms of links for conditional expressions are the "AND" link and the "OR" link.

For example, consider a database containing personnel records for a company. Each employees data record may include variable fields for storing salary and age. A user may then query the database to find those employees that are older than 35 and make less than $50,000 by forming the SQL query: WHERE (age>35) AND (salary<50,000). Here, age is variable 1, 35 is condition 1, salary is variable 2, and 50,000 is condition 2. The logical link operator is the AND link.

Although it is quite easy to visualize the logic of this simple filter, in many cases a user may desire to utilize a query that includes numerous conditional expressions linked in a variety of complex, nested structures. These types of complex data filters are much more difficult to visualize and understand due to the textual nature of the SQL language.

SUMMARY OF THE INVENTION

A system and method for optimizing the structure and display of complex data filters is provided. The system includes software modules for creating, optimizing and then displaying complex data filter queries structured according to a particular query language. The query is modeled by generating a filter network comprising a plurality of filter nodes, wherein each filter node corresponds to a conditional expression in the query. Optimization modules then optimize the structure and visual display of the filter network. The system software modules may include a query input module, a graphical interface module, a visual optimization module, and a query language optimization module. The query input module enables a user to input a data filter query into the system using a particular query language. The graphical interface module then maps the input query into a graphical representation of the data filter using a readily understandable graphical paradigm. The visual optimization module optimizes the graphical display of the query by merging sub-networks of the filter network that generate the same query language, and the query language optimization module optimizes the structure of the input query by eliminating redundant filter nodes.

According to one aspect of the invention, an optimization method for database queries is provided. This method preferably comprises the steps of: (a) receiving a database query described by a query language logical structure; (b) generating a filter network comprising a plurality of filter nodes, wherein the structure of the filter network corresponds to the logical structure of the query; (c) optimizing the structure of the filter network by identifying pairs of redundant filter nodes in the filter network and deleting one of the redundant nodes in the pair; and (d) optimizing the display of the filter network by identifying similar sub-networks in the filter network and merging the sub-networks.

According to another aspect of the invention, a method of displaying a complex data filter is provided. This method preferably comprises the steps of: (i) generating a filter network model for the complex data filter, wherein the filter network model includes an originating node, one or more terminating nodes, and a plurality of filter nodes, wherein the originating node is coupled to the one or more terminating nodes through the plurality of filter nodes; (ii) depicting the originating node as a funnel; (iii) depicting the one or more terminating nodes as faucets; (iv) depicting the filter nodes as boxes, wherein each box contains a conditional expression associated with the filter node; (v) depicting the logical couplings between originating node, the terminating node and the filter nodes using one or more types of pipes; and (vi) displaying the filter network using the funnel, the faucets, the boxes, and the one or more types of pipes.

Yet another aspect of the invention provides a system for optimizing database queries. The system preferably includes: (a) a query input module that receives a database query described by a query language logical structure; (b) a graphical interface module that generates a filter network comprising a plurality of filter nodes, wherein the structure of the filter network corresponds to the logical structure of the query; (c) a structural optimization module that optimizes the structure of the filter network; and (d) a visual optimization module that optimizes the display of the filter network.

Still another aspect of the invention provides a method of structurally optimizing a query, comprising the steps of: (i) generating a filter network comprising a plurality of filter nodes, wherein the structure of the filter network corresponds to the logical structure of the query; (ii) identifying two filter nodes that, together with any succeeding nodes in the filter network, generate the same logical structure; (iii) deleting one of the two filter nodes from the filter network; and (iv) repeating the identifying and deleting steps for each filter node in the filter network.

Another method disclosed provides for visually optimizing a query. This method preferably comprises the steps of: (a) generating a filter network comprising a plurality of filter nodes, wherein the structure of the filter network corresponds to the logical structure of the query; (b) identifying two filter sub-networks that generate the same logical structure; (c) determining whether the two filter networks can be merged; and (d) if so, then merging the two filter sub-networks.

Another method disclosed provides for optimizing the display of complex data filters according to the following steps: (i) receiving a complex data filter including a plurality of filter nodes organized into a filter network, wherein each filter node corresponds to a conditional expression in the complex data filter; (ii) generating a data model for each of the filter nodes in the filter network, wherein the data model includes a conditional expression for each filter node and a corresponding flag that indicates whether or not the node has been optimized; and (iii) optimizing the display of the filter network by: identifying similar sub-networks in the filter network; merging the similar sub-networks; and setting the flag for one of the filter nodes in the merged sub-network to indicate that the node has been optimized.

It should be noted that these are just some of the many aspects of the present invention. Other aspects not specified will become apparent upon reading the detailed description of the preferred embodiment set forth below.

DETAILED DESCRIPTION OF THE DRAWINGS

Figure 1:
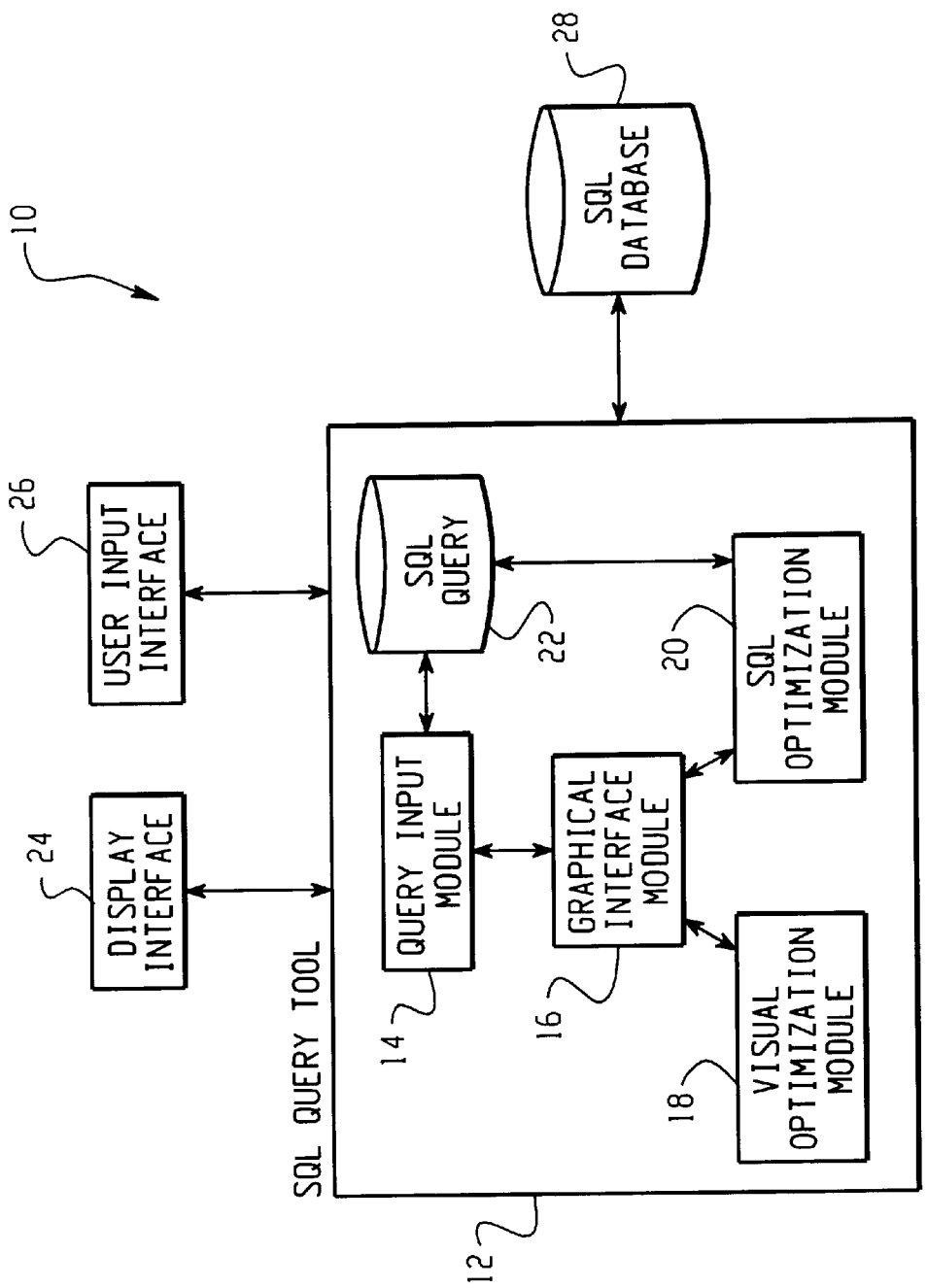
FIG. 1 is a block diagram of a preferred system according to the present invention.

Turning now to the drawing figures, FIG. 1 sets forth a block diagram of a preferred system 10 according to the present invention. This system 10 preferably includes an SQL Query Tool 12 (or other form of query language tool), a display interface 24, a user input interface 26 and an SQL database 28 (or some other form of database that a user desires to query.) The SQL Query Tool 12 preferably includes a query input module 14, a graphical interface module 16, a visual optimization module 18, an SQL optimization module 20, and an SQL query data store 22. Although these modules are shown as being coupled in a particular manner, they could be coupled in some other manner.

The display interface 24 may be a display screen, such as is commonly associated with a desktop computer, laptop, PDA, etc. The display interface 24 receives video data signals from the SQL Query Tool 12 and displays these signals so as to depict a graphical representation of the query. The user input interface 26 may be any type of mechanism for inputting data and instructions into the SQL Query Tool 12, such as a keyboard, mouse, microphone, etc. The SQL database 28 may be any type of data storage structure, such as a data warehouse, data mart, or any other type of database where records are stored that may be searched and retrieved using a data analysis tool.

The SQL Query Tool 12 is preferably implemented as a software program that is part of a comprehensive data mining application for use in data analysis and search and retrieval operations on a database. An example of such a data mining application is Enterprise Miner, which is available from SAS Institute, Inc., of Cary, N.C. Alternatively, however, the SQL Query Tool 12 may be a stand-alone software application, a downloadable applet, or some other form of software-based application. This software may be embodied in a tangible medium, or product, such as a magnetic medium, or an optical medium such as a CD-ROM.

Several modules are preferably included in the SQL Query Tool 12, such as a query input module 14, a graphical interface module 16, a visual optimization module 18, and an SQL optimization module. Also included in (or associated with) the SQL Query Tool may be an SQL query data store 22.

The query input module 14 enables a user to input a data filter query into the system 10. This module 14 interacts with the graphical interface module 16 and the display and user input interfaces 24, 26 to enable the user to create, edit, and then save data filter queries to the SQL query data store 22. In one embodiment, this query input module 14 provides a window for inputting and manipulating data filter queries, as shown in more detail in FIGS. 2A–5B, set forth below. Although not explicitly shown in these figures, the query input module 14 may provide a menu bar for selecting certain query operations, such as "create a new query," "save a query," "store a query," etc. In one embodiment of the invention, a user inputs a complex data filter query by inputting the SQL query language directing into a text window or by retrieving the text of the SQL query from some storage location. In another embodiment of the invention, the user builds the query graphically using the elements of the graphical paradigm described in more detail below. In either case, the system 10 generates a filter network comprising a plurality of filter nodes that logically corresponds to the textual query language of the data filter.

The data filter queries that are input and manipulated by the system shown in FIG. 1 are preferably SQL-type queries. Alternatively, however, other types of data queries could be used with the system and software modules described herein.

Typically, when creating a database query, a user desires to limit or filter in some manner the data records stored in the database 28 for subsequent analysis. This filtering is typically achieved by using the SQL WHERE clause, which is typified by the syntax "WHERE (variable 1 <operator> condition 1) link (variable 2 <operator> condition 2)" then return the data records whose variables meet the stated conditions. For example, the clause could be written "WHERE (haircolor='Red') or (salary<50,000)," in which case data records would be retrieved from the database in which the haircolor variable was 'Red ' or the salary variable was a number less than 50,000.

The WHERE clause typically includes multiple conditional expressions, each of which is modeled in the present invention as a filter node. The filter nodes are logically linked together to form a filter network. For example, in the WHERE clause, a filter node may be linked to another filter node by the AND link operator. Alternatively, the nodes may be linked by the OR link operator. These link operators are logical constructs that couple the nodes together in order to form a more complex data filter. Further examples of various complex data filters including multiple filter nodes coupled by multiple link operators are described below in connection with FIGS. 2–5. Although this patent application refers specifically to filtering using the SQL WHERE clause, it should be understood that this is just an example, and other forms of SQL clauses, such as the HAVING clause or the ON clause, or any other form of query language filtering clauses, could be used with the teachings described herein.

The graphical interface module 16 is coupled to the query input module 14 and graphically maps the SQL statement (or clause) into a graphical representation of the data filter using a more readily-understandable graphical paradigm. Alternatively, the graphical interface module interacts with the query input module 14 in order to enable the user to build the query directly using the graphical representation. In either case, the graphical interface module 16 builds a model of the query using a plurality of filter nodes that are linked to form a filter network.

One of the problems with manipulating complex data filter queries is that as the filter becomes more complex and includes more interconnected filter nodes, it becomes difficult, if not impossible, to understand the logic of the filter. For this reason, the present invention includes a graphical interface module 16 that converts the complex logic of the SQL query into a graphical paradigm, which is preferably based on the concept of water passing through a plumbing system.

As shown and described in more detail below with reference to FIGS. 2–5, this plumbing paradigm graphically depicts the complex data filter as a network of filter nodes that are linked by pipes, and which includes a single originating node and one or more terminating nodes. Each filter node represents a condition of expression of the SQL clause. These filter nodes are then linked by at least two types of pipes, a straight-line pipe that represents the AND link operator, and a tee-line pipe that represents the OR link operator. The originating node of the filter is represented as a giant funnel, and the one or more terminating nodes are represented by faucets. Any data records that successfully traverse the filter network from the origin, through the filter nodes, and to one of the terminating nodes, have met the filter conditions for this clause, and should be retrieved from the database. By depicting the complex SQL query using this graphical paradigm, a user of the SQL Query Tool 12 can more easily input, manipulate, and understand complex data filter queries.

Also provided in the preferred embodiment of the invention are two optimization modules, a visual optimization module 18 and a query language optimization module 20.

The visual optimization module 18 optimizes the graphical display of the data filter query by merging sub-networks of the filter network that generate the same query language, and the query language (or SQL) optimization module 20 optimizes the structure of the data filter query by eliminating redundant filter nodes from the filter network.

The visual optimization module 18 analyzes the filter network to determine whether there are sub-networks that can be merged in order to simplify the display of the filter network through the graphical interface module 16. The visual optimization module 18 does not change the logic of the SQL clause in any manner, but rather it identifies parts of the filter network that include similar query language and, where possible, merges the relevant filter nodes in order to simplify the displayed filter network. The query language optimization module 20, by distinction, identifies redundant filter nodes in the network and removes or deletes one of the redundant nodes in order to minimize the logical structure of the SQL query.

These two modules 18, 20 may operate in many different modes. In a first mode, the user may manually select to execute one or both of these optimization modules by making a selection from the menu bar of the query input module 14. In another mode, the optimization modules 18, 20 are automatically executed by the SQL Query Tool 12 in order to optimize the structure and display of the input query. In still another mode, the optimization modules are linked in some manner, so that one of the modules calls, or causes to be executed, the other module. In this later mode, a user may select an "optimization" entry from the query input module 14, which then executes both of the optimization modules by executing one of the modules first, which in turn executes the other module. The preferred methodology of the visual optimization module 18 is described below with reference to FIGS. 6–8. The preferred methodology of the SQL optimization module 20 is described below with reference to FIGS. 10–11.

Figure 2A:
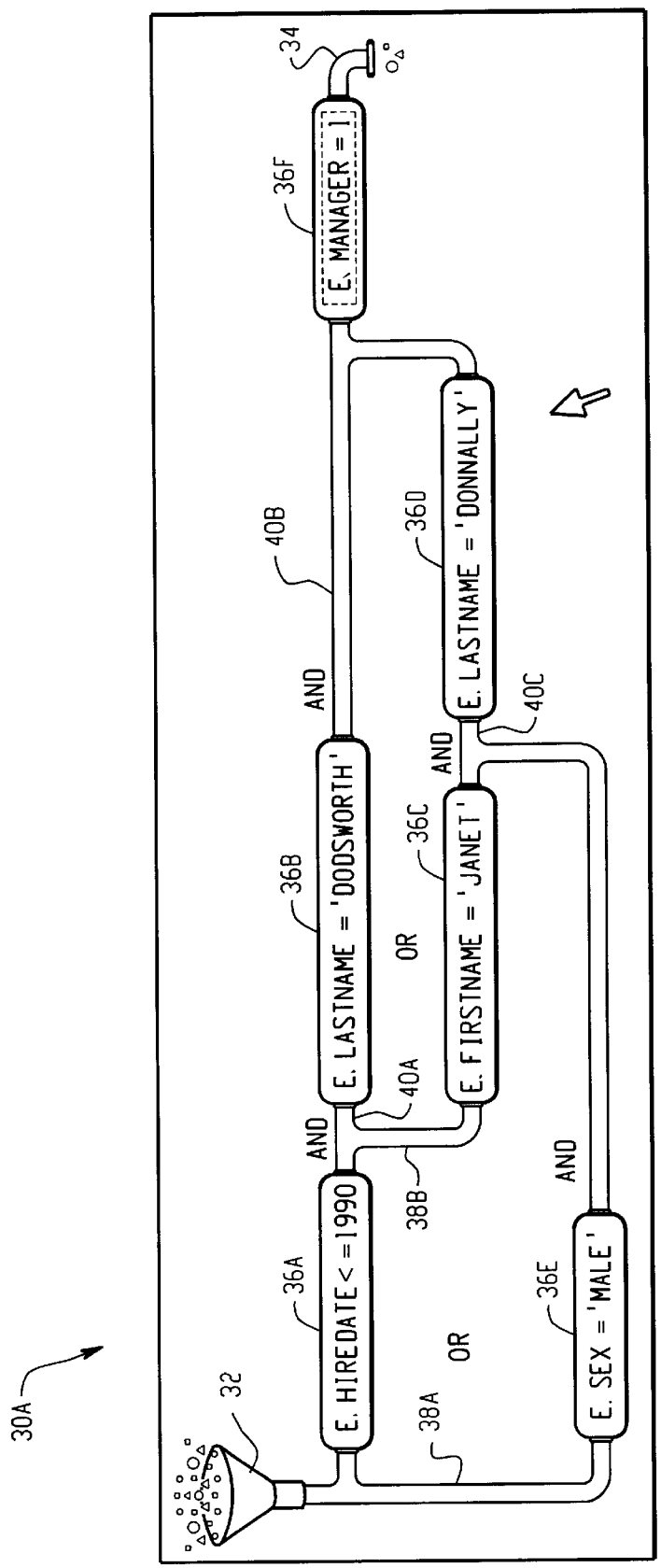
FIG. 2A is a graphical representation of a complex data filter that has been visually optimized according to a preferred visual optimization method of the present invention.
Figure 2B:
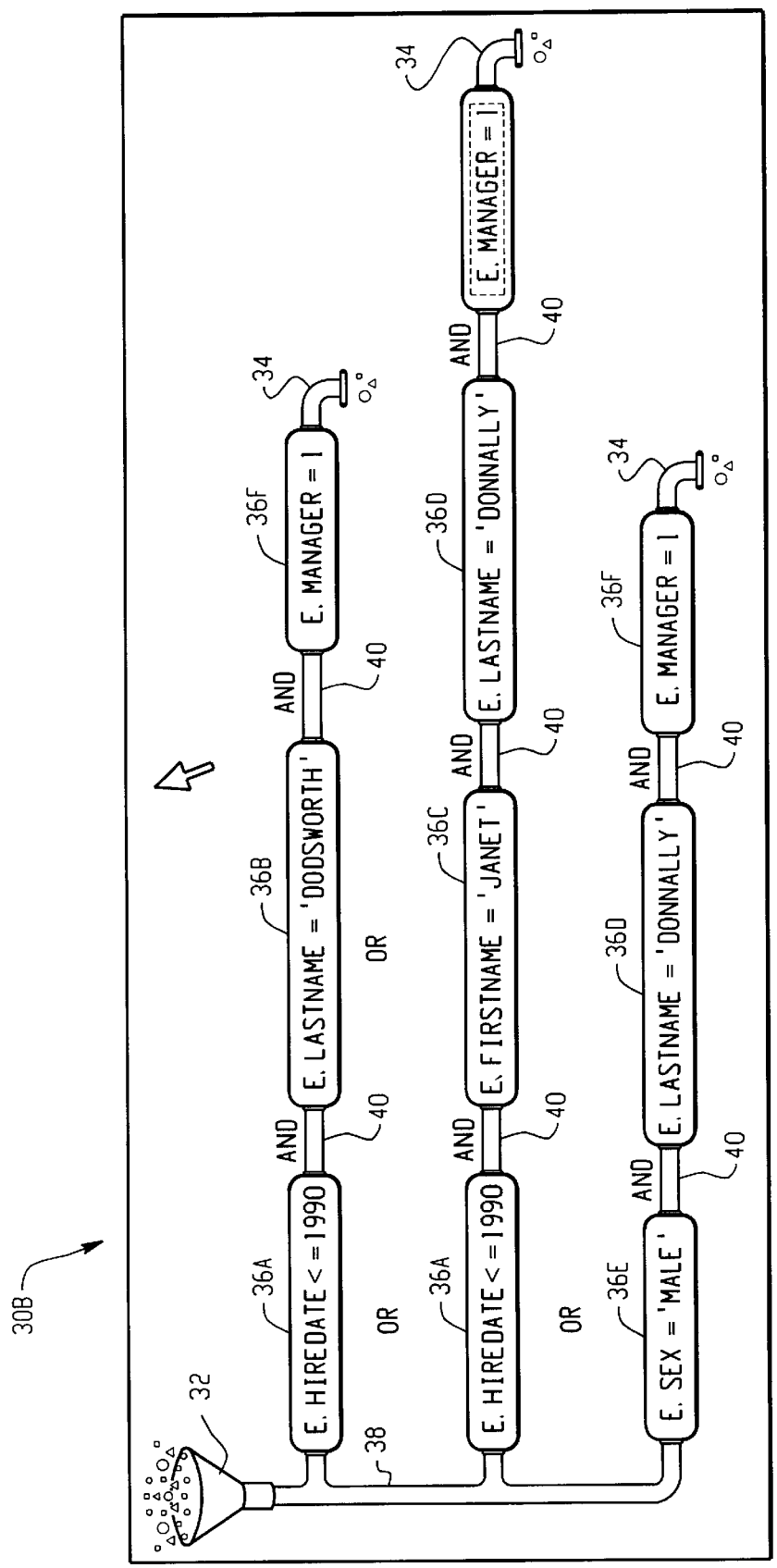
FIG. 2B is a graphical representation of the complex data filter shown in FIG. 2A prior to visual optimization.

FIG. 2A is a graphical representation of a complex data filter that has been visually optimized according to the preferred visual optimization method of the present invention, and FIG. 2B is a graphical representation of the complex data filter shown in FIG. 2A prior to visual optimization. Both of these graphical representations have been rendered (or graphically depicted) according to the preferred graphical paradigm of the present invention. As seen in FIG. 2A, the originating node 32 is depicted as a giant funnel and the terminating node 34 is depicted as a faucet. Between the originating node 32 and the terminating node 34 are a plurality of filter nodes 36A–36F, each of which adds a particular filter condition to the network. These filter nodes are coupled by two types of logical pipes, straight-line pipes 40A–40C which represent AND link operators in the SQL clause, and tee-line pipes 38A–38B which represent OR link operators in the SQL clause.

The filter network shown in FIG. 2A equates to the SQL where clause:

WHERE ((E.HireDate<=1990 AND ((E.LastName= 'Dodsworth' AND
E.Manager=1) OR (E.FirstName='Janet' AND
E.LastName='Donnally' AND E.Manager=1))) OR
(E.Sex='Male' AND E.LastName='Donnally' AND
E.Manager=1)).

The logic of this filter is easier to read and understand when depicted graphically, such as in FIG. 2A, rather than in its raw SQL form shown above. Note that the filter condition "E.LastName='Donnally'" must be repeated twice in the raw SQL clause, but it is only depicted as one filter node 36D in the network shown in FIG. 2A, because this network has been visually optimized according to the present invention.

If the network were generated node-by-node from the raw SQL clause, then the network might be rendered as shown in FIG. 2B. Clearly, however, the network of FIG. 2B, which has not been visually optimized, is larger and more difficult to read and comprehend than the network of FIG. 2A. In addition, the non-optimized depiction in FIG. 2B does not illustrate the interrelationships that some of the filter nodes contribute to the network, e.g., the "E.Manager=1" filter node and the "E.LastName='Donnally'" filter node, which are present in more than one sub-network. One of the problems addressed by the present invention is how to create the optimized filter network shown in FIG. 2A instead of the more difficult to understand network shown in FIG. 2B.

Figure 3A:
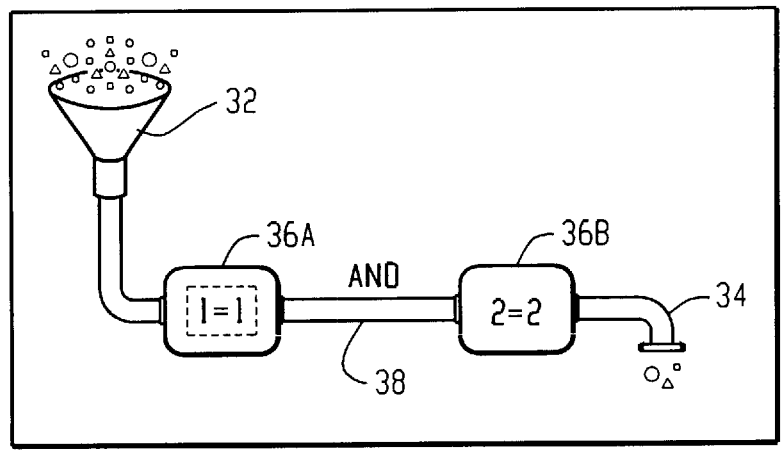
FIG. 3A is a graphical representation of a complex data filter having two filter nodes rendered according to a preferred graphical paradigm of the present invention.

FIG. 3A is a graphical representation of a complex data filter having two filter nodes rendered according to a preferred graphical paradigm of the present invention. This simplified network includes an originating node 32, a terminating node 34, a first filter node 36A, a second filter node 36B and an operative link 38 which connects the two filter nodes 36A, 36B. As noted above, in a preferred embodiment of the present invention, a graphical paradigm is utilized to display the complex data filter networks that is based upon water flowing through plumbing fixtures. In this case, water flow is equated with data flow through the filter. This is only one paradigm for graphically depicting complex data filters, however, and other techniques for illustrating the flow of information through the filter network could be utilized.

According to this plumbing paradigm, the originating node 32 of the filter network is depicted as a giant funnel. Data records being analyzed by the filter network are input into the originating node 32. The output of the filter network, or terminating node 34, is depicted as a faucet. Each of the filter conditional expressions or filter nodes, in the SQL clause are depicted as blocks 36A, 36B. The relevant filter condition is printed within each block. For the purpose of simplifying the drawing figures, simplistic conditional expressions such as "1=1" and "2=2" have been substituted for the more realistic type of conditional expressions shown in FIGS. 2A–2B.

The filter nodes are coupled to the originating node 32, the terminating node 34 and to each other by a series of pipes. Each filter node has an input pipe and an output pipe. Only data records that match the filter's condition pass through the filter from the input pipe to the output pipe. In some cases the input pipe is coupled to the originating node 32. And in some cases the output pipe is coupled to the terminating node 34. Between the filter nodes are a variety of link pipes. These link pipes correspond to the link operator types of the SQL clause. For example, the straight-line pipe 38 shown in FIG. 3A is an AND pipe. Thus, the filter network depicted in FIG. 3A corresponds to the SQL clause "WHERE ((1=1) and (2=2))".

Figure 3B:
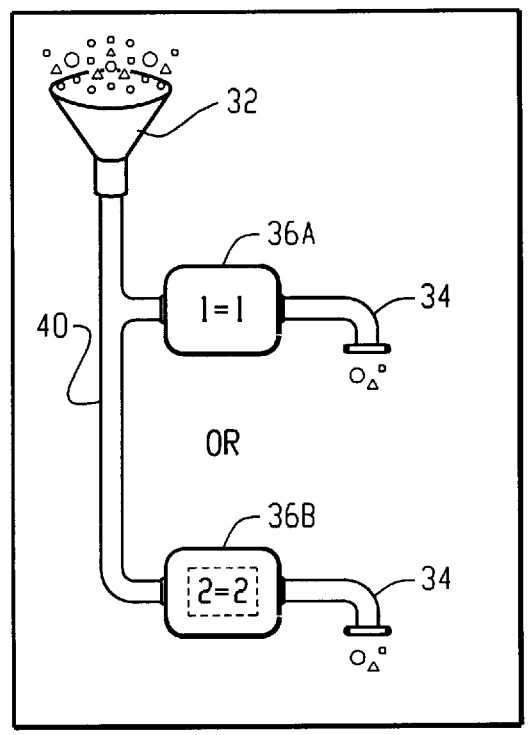
FIG. 3B is another graphical representation of a complex data filter having two filter nodes rendered according to a preferred graphical paradigm of the present invention.

FIG. 3B is another graphical representation of a complex data filter having two filter nodes rendered according to a preferred graphical paradigm of the present invention. Here, however, instead of the nodes being connected by a straight-line AND pipe, the nodes are coupled by a tee-line pipe 40 that corresponds to the OR operator. The filter network depicted in FIG. 3B corresponds to the SQL clause "WHERE ((1=1) or (2=2))". The graphical elements shown in FIGS. 3A–3B form the basic building blocks of the graphical paradigm of the present invention, and can be used to render complex data filter expressions in graphical form.

Figure 4A:
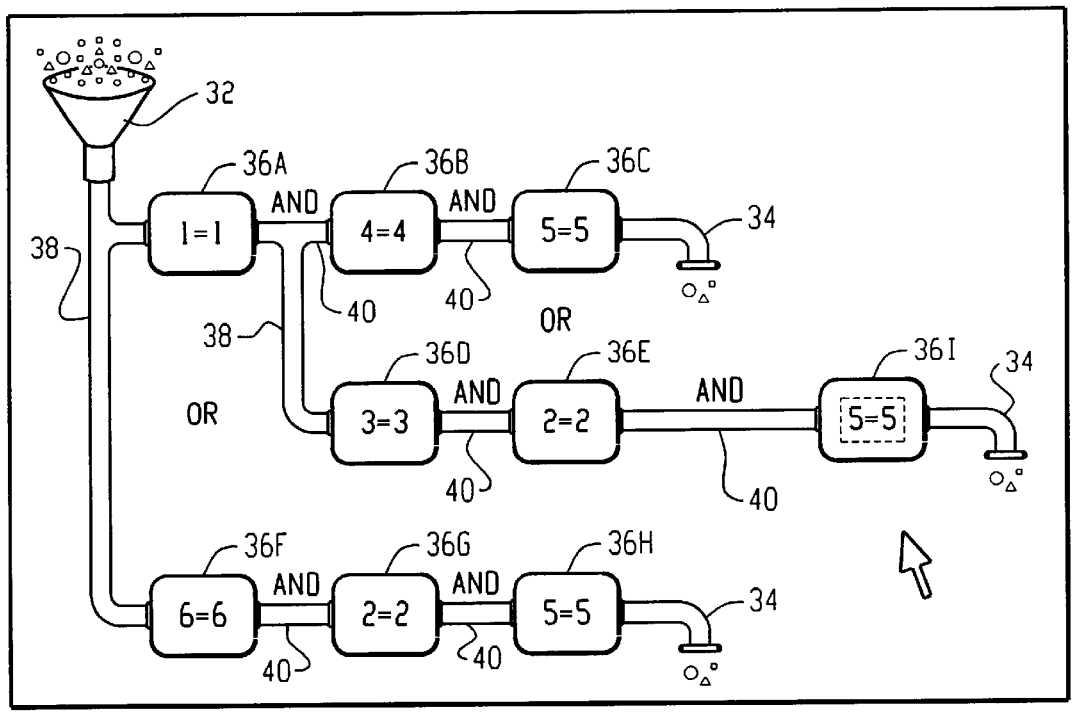
FIG. 4A is a graphical representation of a complex data filter prior to visual optimization.

FIG. 4A is a graphical representation of a complex data filter prior to visual optimization. The raw SQL for this filter would be as follows:

WHERE ((1=1 AND ((4=4 AND 5=5) OR (3=3 AND 2=2 AND 5=5))) OR (6=6 AND 2=2 AND 5=5)).

Note that the "2=2" condition is repeated twice in this SQL, and the "5=5" filter condition is repeated three times. This repetition causes even a small filter such as this to be difficult to comprehend. The straight conversion of this filter network to the graphical paradigm of the present invention is shown in FIG. 4A, but this still does not reveal the importance of certain nodes in the network.

Figure 4B:
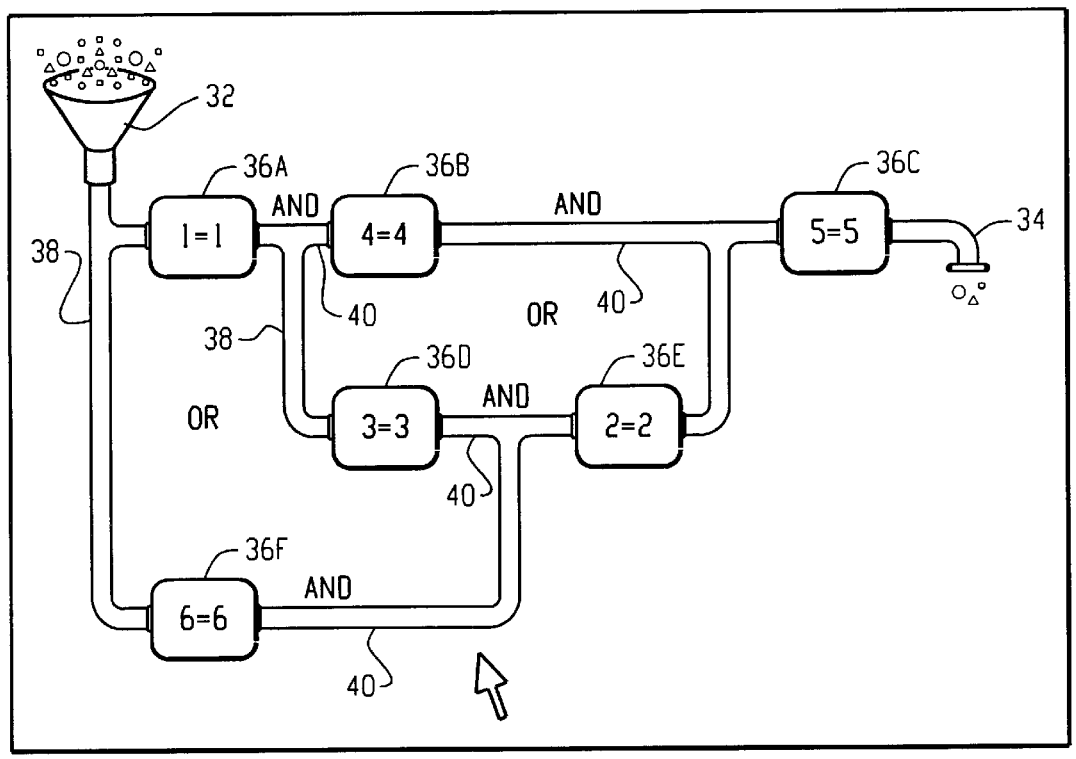
FIG. 4B is a graphical representation of the complex data filter shown in FIG. 4A after visual optimization.

After visually optimizing the display according to the present invention, however, the depiction set forth in FIG. 4B is displayed. Here, the filter nodes 36A–36H of FIG. 4A have been merged into the filter nodes 36A–36F shown in FIG. 4B. The visually optimized network shown in FIG. 4B clearly depicts the logic of the filter, e.g., that the "5=5" filter condition must be satisfied by all data records passing through the network. The visual optimization algorithm (described in more detail below) identifies the filter nodes (or sub-networks) that generate the same SQL and merges them so that the graphical depiction of the network is simplified, and thus the query becomes easier to comprehend. Here, the sub-networks (2=2 AND 5=5) have been merged in the middle and bottom filter node chains, and the filter node 5=5 in the upper chain has then been merged with the remaining 5=5 node from the merger of the sub-networks.

Figure 5B:
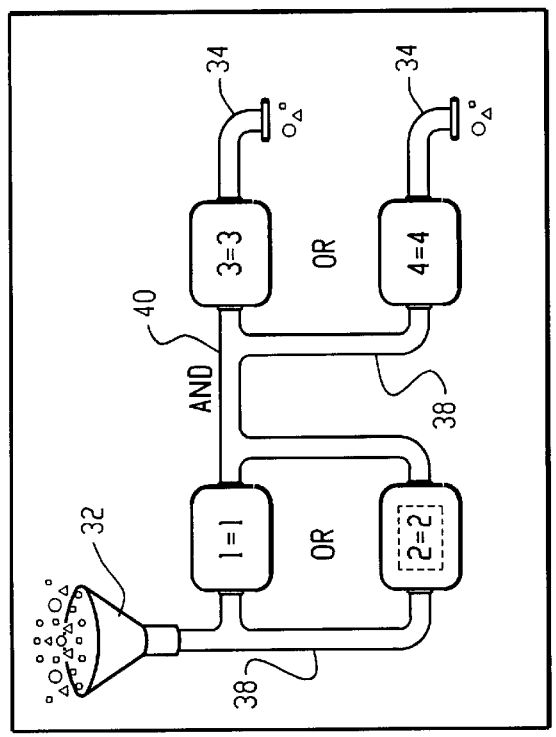
FIG. 5B is a graphical representation of the complex data filter shown in FIG. 5A after visual optimization.
Figure 5A:
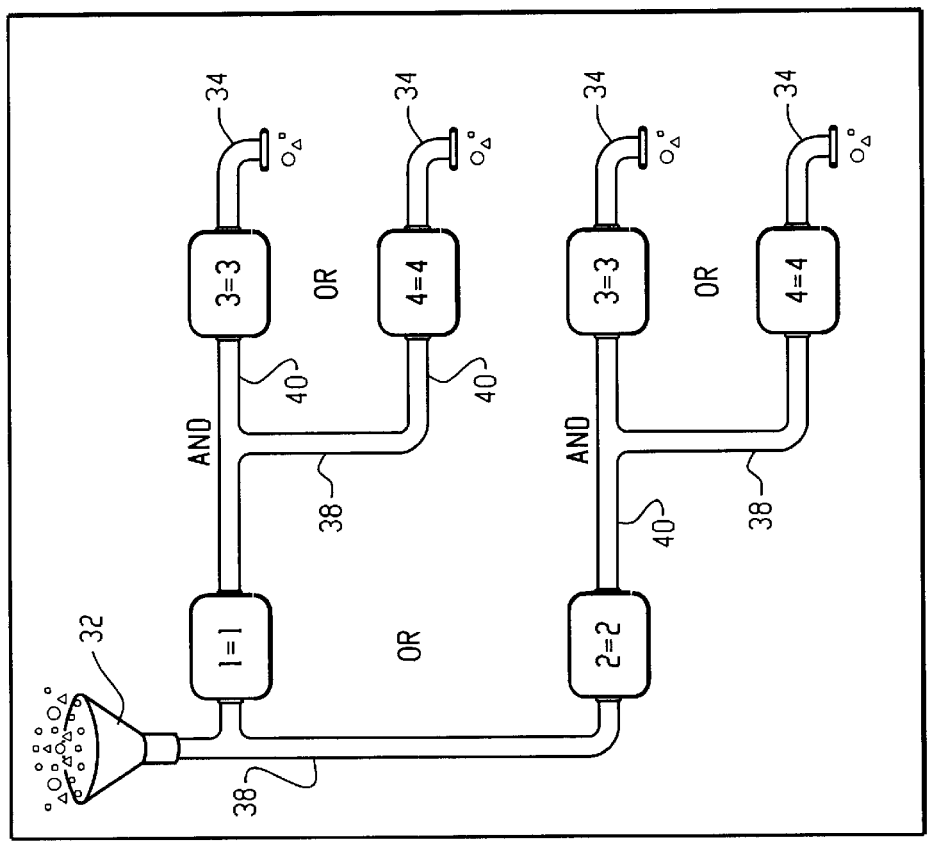
FIG. 5A is another graphical representation of a complex data filter prior to visual optimization.

FIG. 5A is another graphical representation of a complex data filter prior to visual optimization, and FIG. 5B is a graphical representation of the complex data filter shown in FIG. 5A after visual optimization. These figures demonstrate that even a small four-node network can be depicted in a more readily-understandable manner using the techniques of the present invention.

Figure 6:
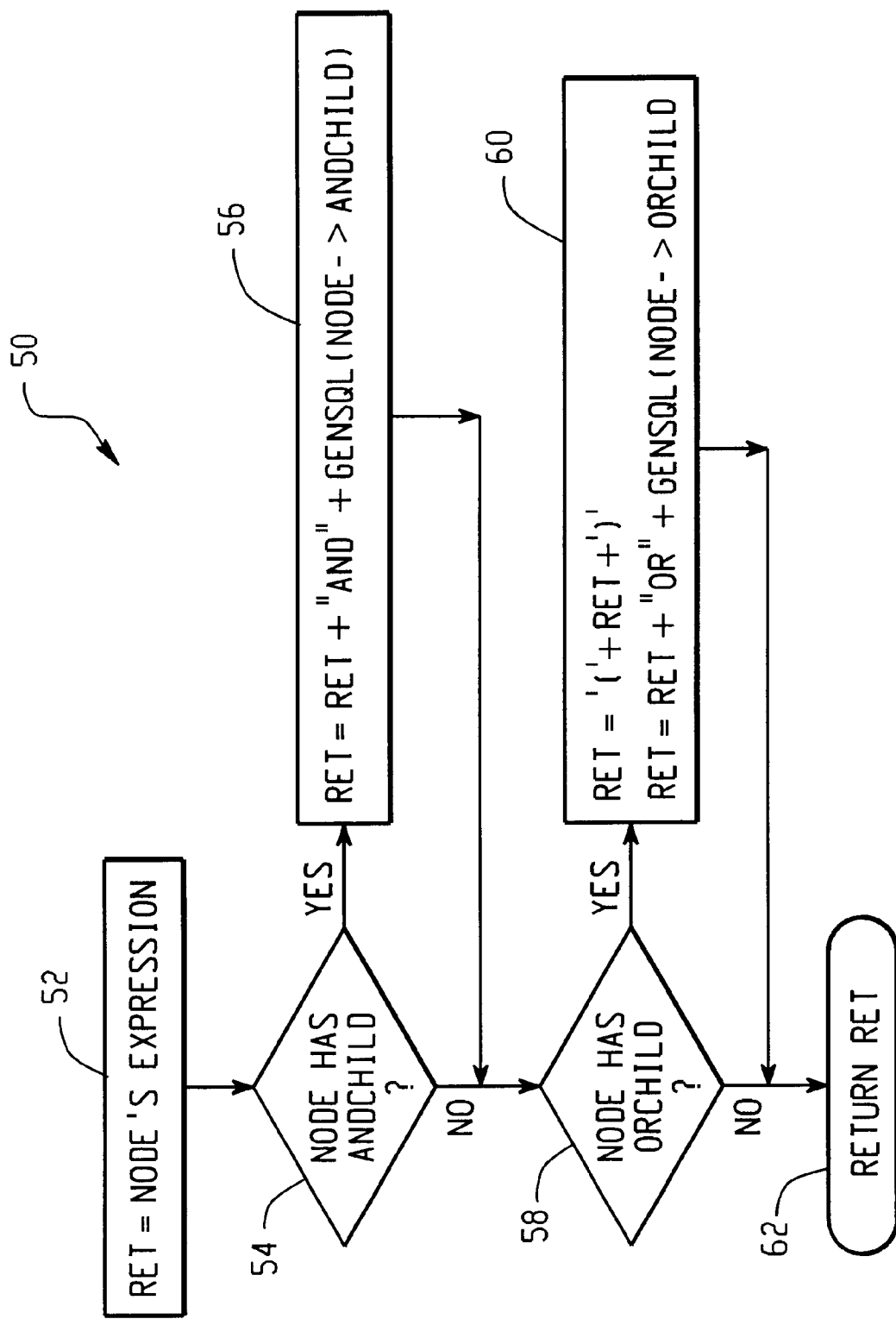
FIG. 6 is a flowchart setting forth the preferred steps for generating the query language associated with a particular filter node and any successor nodes that are "ORed" with the filter node.
Figure 7:
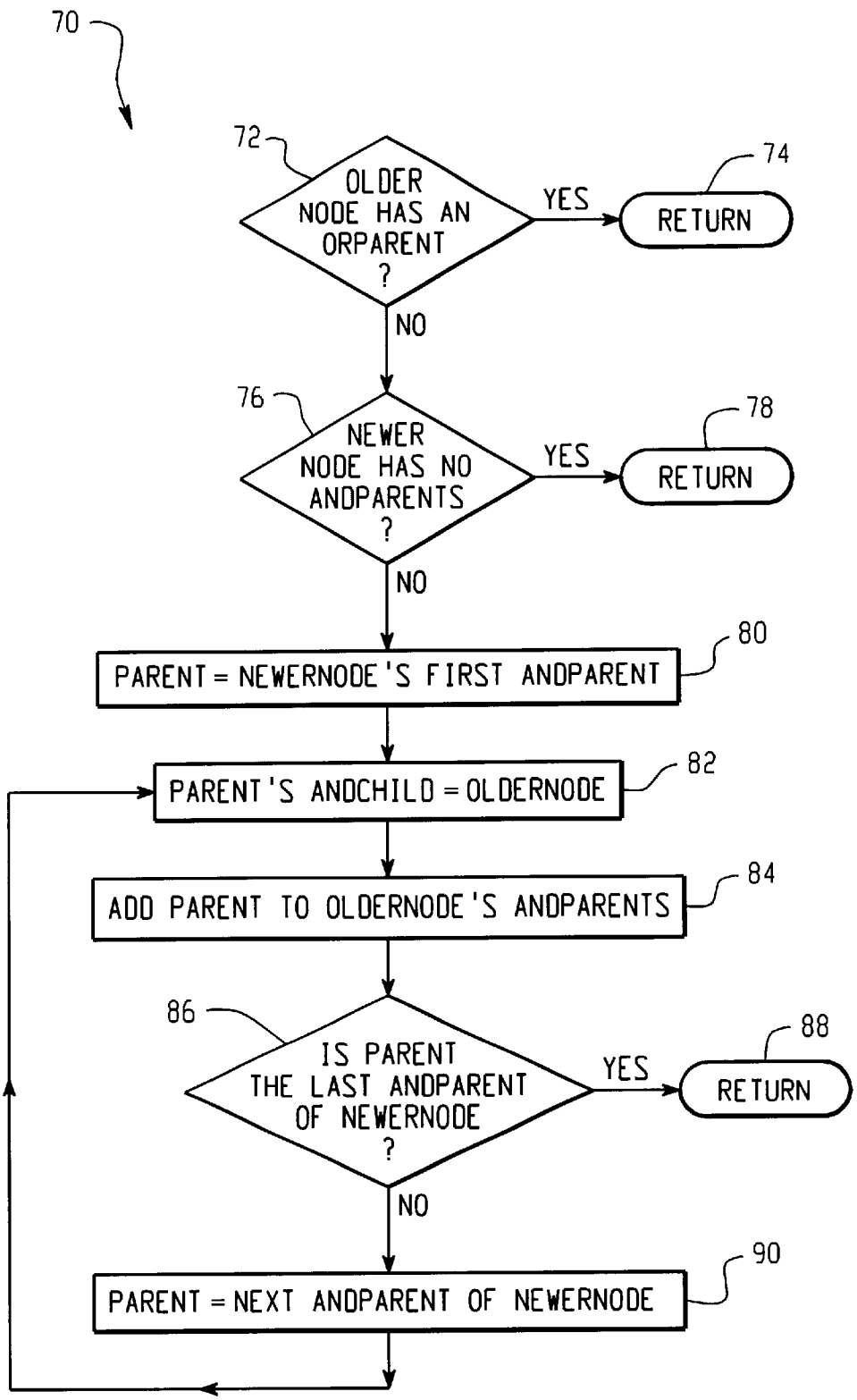
FIG. 7 is a flowchart setting forth the preferred steps for merging sub-networks according to the present invention.
Figure 8:
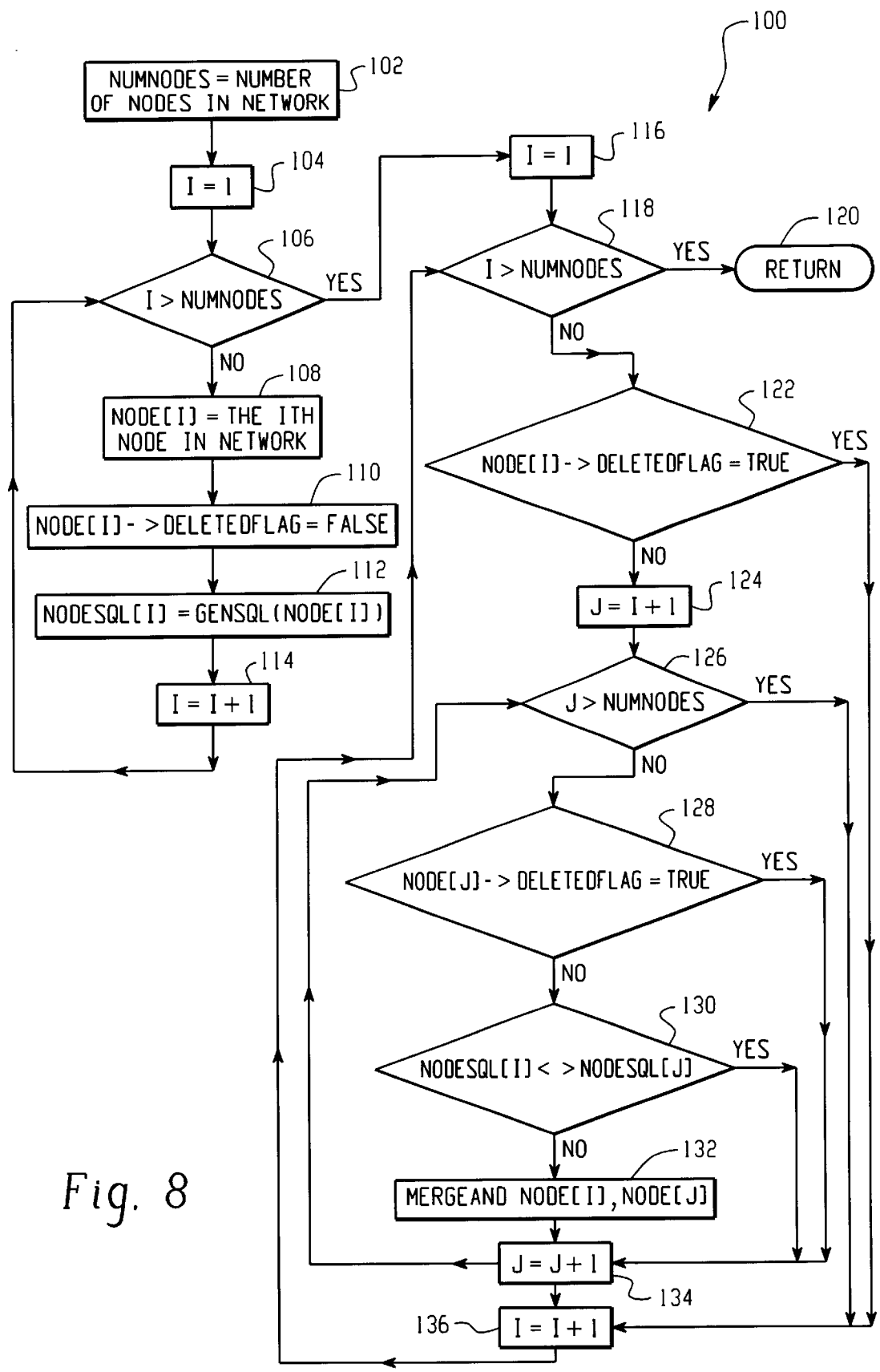
FIG. 8 is a flowchart setting forth the preferred steps for visually optimizing a complex data filter according to the present invention.

Turning now to the detailed description of the preferred methodology for optimizing the visual and structural aspects of the data filter network, FIGS. 6–8 set forth a series of flow charts that describe a software implementation of the visual optimization module 18. This module 18 includes a main program, the operation of which is shown in FIG. 8, and two sub-programs, the operation of which is shown in FIGS. 6 and 7. The sub-program shown in FIG. 6 generates the query language associated with a particular filter node and any successor nodes than are "ORed" with the filter node, and is referred to as "GENSQL". The sub-program depicted in FIG. 7 merges particular sub-sets of the network that are identified by the main program, and is referred to as "MERGEAND".

Figure 9B:
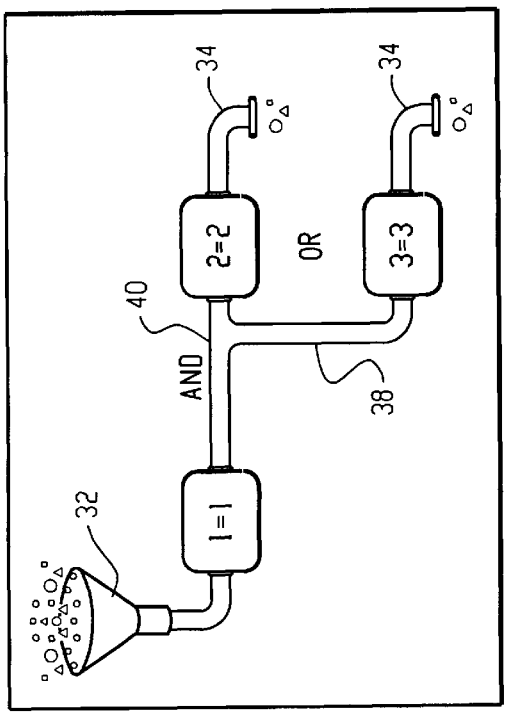
FIG. 9B is a graphical representation of the complex data filter in FIG. 9A after structural optimization.
Figure 9A:
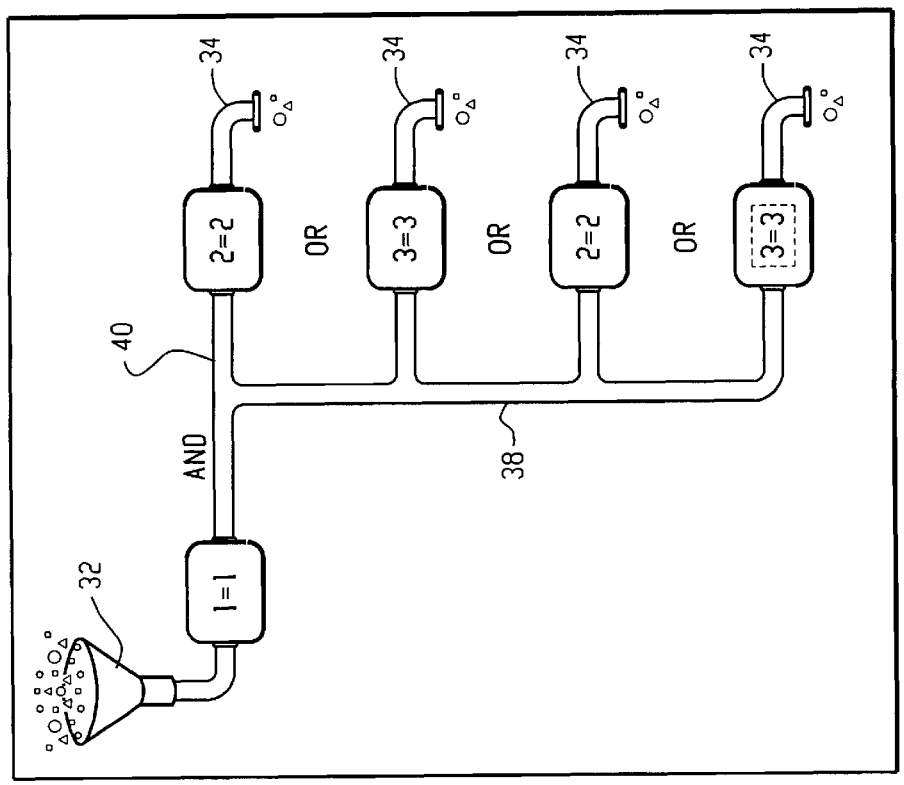
FIG. 9A is a graphical representation of a complex data filter prior to structural optimization.
Figure 10:
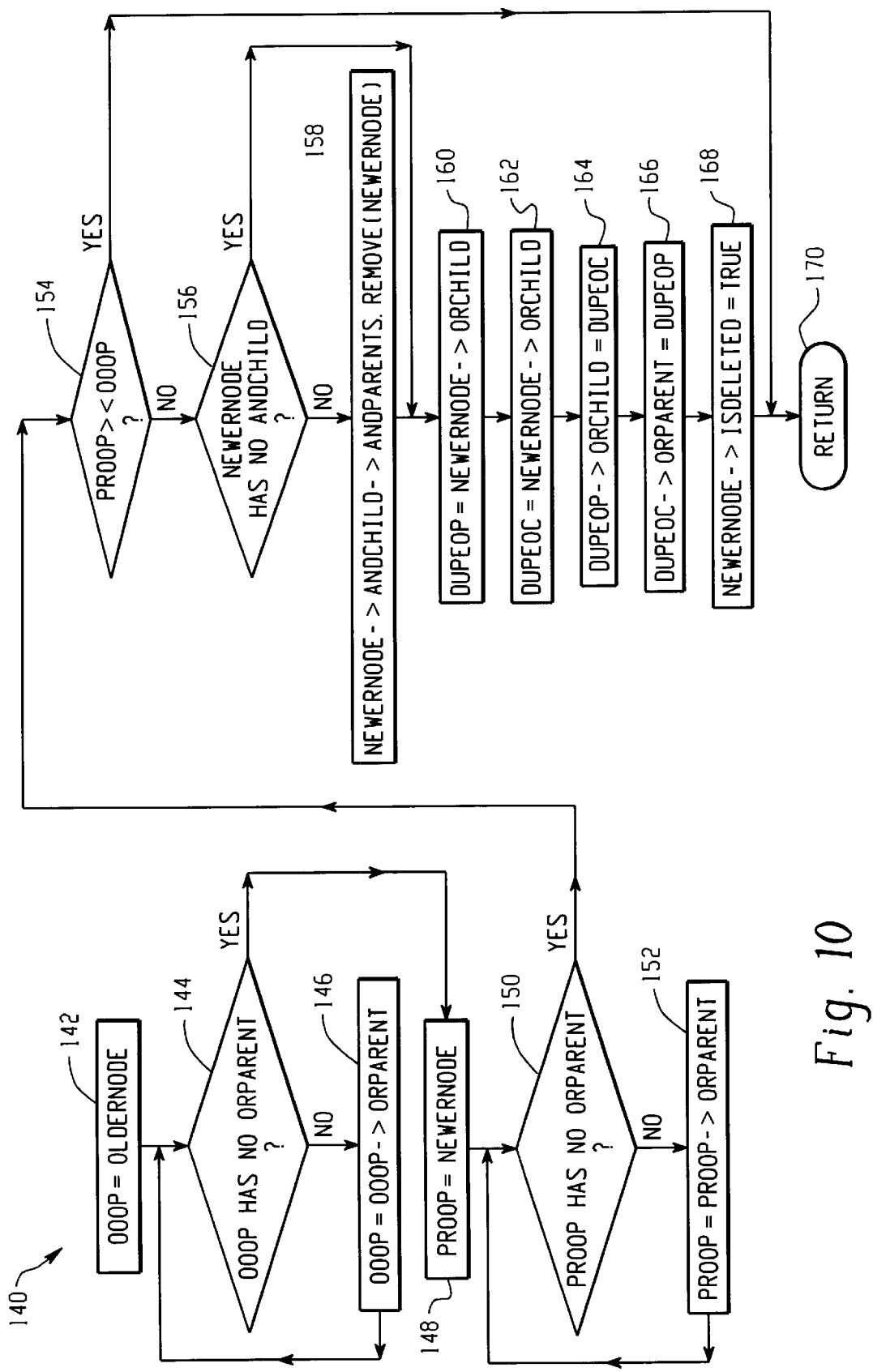
FIG. 10 is a flowchart setting forth the preferred steps for eliminating redundant filter nodes according to the present invention.
Figure 11:
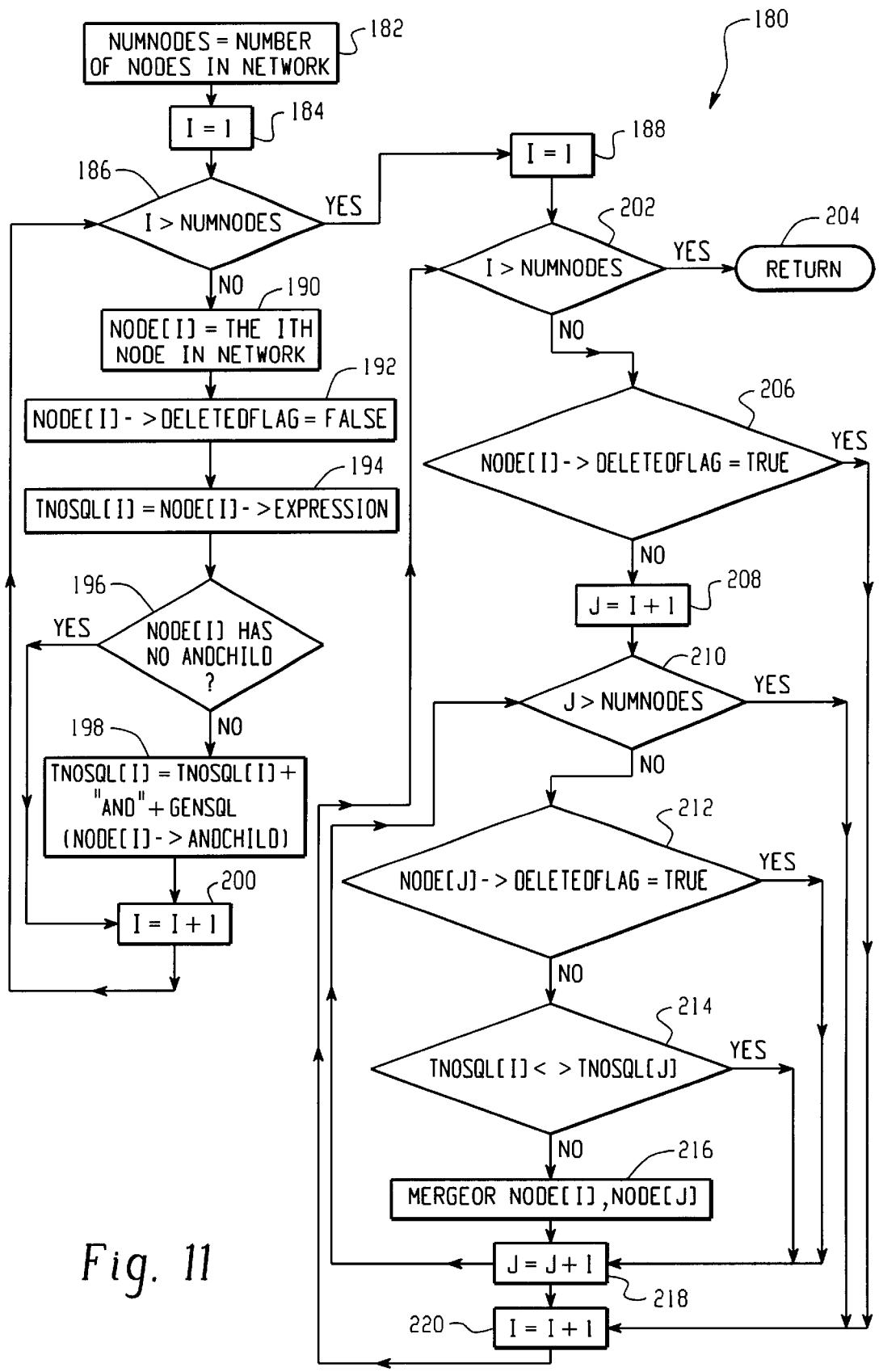
FIG. 11 is a flowchart setting forth the preferred steps for structurally optimizing the query language in a complex data filter according to the present invention.

Likewise, FIGS. 10–11 set forth flow charts that describe a software implementation of the SQL optimization module 20. FIG. 11 depicts the main program for optimizing the structure of the SQL clause. This program calls two sub-programs, the GENSQL program depicted in FIG. 6, and a sub-program that deletes redundant filter nodes referred to as "MERGEOR". FIGS. 9A–9B set forth an example of a simple network that has been structurally optimized according to the methodology described in FIGS. 10–11.

Before turning to these various flowcharts, it is instructive to understand the preferred data model of the present invention for storing information used to construct and depict the filter network. For each filter node (N) in the network, the following information is preferably stored by the system:

(i) N's conditional expression, which is the filter condition of the node, such as "haircolor=brown";

(ii) a deletion flag, which indicates to the system whether the node has been deleted or merged by the optimization modules;

(iii) N's "andChild," which is another filter node that is "ANDed" to node N, e.g., in the graphical representations discussed above, the andChild of a particular node (N) would be the node that is displayed to the right of node N and connected to its output by a straight-line AND pipe;

(iv) N's "orChild," which is another filter node that is "ORed" to node N, e.g., the orChild of a particular node (N) would be the node that is displayed below node N and connected to its input by a tee-line OR pipe;

(v) N's "orParent," which is another filter node that node N is logically "ORed" to, e.g., the orParent of a particular node (N) would be the node that is displayed above N and connects node N's input to the orParent's input using a tee-line OR pipe; and (vi) N's "andParent," which is another filter node that node N is logically "ANDed" to, e.g., the andParent of a particular node (N) would be the node that is displayed to the left of node N and coupled to the input of node N by a straight-line AND pipe. Note that there are some situations where a node N may have more than one Parent. For example, considering FIG. 5B, the filter node depicted with the condition "3=3" has two andParents, node "1=1" and node "2=2".

Thus, according to this data model, each filter node includes: (i) a conditional expression; and (ii) a deletion flag; and may include one or more of the following: (iii) an andChild; (iv) an orchild; (v) an orParent; and/or (vi) one or more andParents. A filter node with no orParent or andParents is the first node from the originating node. A node with no orchild or andChild is coupled to a terminating node.

In this model, when a number of filter nodes are "ORed" together, such as nodes "3=3" and "4=4" in FIG. SB, then the top node is used to manage the andParents for all of the nodes that are "ORed" together, and the other nodes in the OR chain do not need to maintain any andParent links. Thus, for example, the node "4=4" in FIG. 5B would have an orParent of node "3=3" but no andParents. Node "3=3" would have no orParents, but an andParent of node "1=1". Thus, any given node can have either an orParent or one or more andparents, but not both.

FIG. 6 is a flowchart setting forth the preferred steps for generating the query language associated with a particular filter node and any successor nodes that are "ORed" with the filter node. This flowchart describes the steps of the GEN-SQL function, which is used by both the visual optimization module 18 and the SQL optimization module 20. The GENSQL function is a recursive function that operates on a particular node, and which turns a string (RET) containing the SQL for the part of the network that goes through a particular node's condition, plus the SQL derived from any of the node's orChildren. A pseudocode description of the GENSQL function is set forth below:

Function GENSQL(node)
   String returnvalue=node's expression
   If node has an andChild then
     Returnvalue=returnValue+"AND" genSQL(node's andChild)
   End if
   If node has an orChild then
     Returnvalue "("+returnvalue+")"
     Returnvalue=returnValue+"OR" genSQL(node's orChild)
   End if
   Return returnvalue
End function GenSQL The GENSQL function begins at step 52, where the return value (RET) of the function is set equal to the node's conditional expression. The function then determines, at step 54, whether or not this particular node has an andChild. If not, then control passes to step 58. If, however, there is an andChild, then control passes to step 56, where a recursive function call is made to the GENSQL function that sets the return value (RET) equal to the current return value (RET) "ANDed" with the return value from the GENSQL function call for the node's andChild. After the recursive function call(s) have been completed and all of the SQL has been generated for the andChildren, control then passes to step 58. Note that in these recursive function calls to GENSQL for the andChildren, the steps 58–62 may also be executed in order to generate any orChild SQL for the andChildren.

At step 58, the function determines whether or not this particular node has any orChild. If not, then the function ends at step 62 and returns the value RET, which is the string that contains the SQL for the part of the network associated with the node being analyzed. If there is an orChild, however, then control passes to step 60. At step 60, the return value (RET) is set equal to itself, but parentheses are added to either side of the string in order to encapsulate the sub-expression, and then this new string (RET) is set equal to itself "ORed" with the return value from another recursive function call to GENSQL for the node's orChild. Like with the andChildren, the recursive function call to the orChildren nodes will result in the SQL being generated for the rest of the filter network associated with the orChildren. After the recursive function call(s) have been completed and all of the SQL has been generated for the orchildren, control then passes to step 62 and the function ends by returning the RET string to the calling program.

FIG. 7 is a flowchart setting forth the preferred steps for merging sub-networks according to the present invention. This flowchart describes the MERGEAND function, which, like the GENSQL function is called by the visual optimization algorithm described in more detail below with reference to FIG. 8. The purpose of the MERGEAND function is to merge two identical subsets of the filter network (or subtrees) so that the number of filter nodes displayed through the graphical interface module 16 is minimized. A pseudocode description of the MERGEAND function is set forth below.

Function MergeAND(olderNode, newerNode)
   /* olderNode and newerNode are two subtrees of SQL that generate the same thing. If they are both complete trees (rather than being just part of a larger OR chain), we can merge the two trees into one in the larger network. Because they are complete trees the two nodes either have andParents or are the first node in the network. For them to have orParents would mean they were not complete trees. */
   If olderNode has an orParent
     then return (because we're only trying to merge complete trees and this is the middle of a bigger OR chain)
   If newerNode doesn't have at least one andParent then return (again because the node must then have an orParent and we only want complete trees)
   For each andparent of newerNode
     Set that node's andChild to olderNode instead of newerNode
     Add that node to olderNode's andParents list
   End for
   Set newerNode's "deleted" flag to true
End routine mergeAND The MERGEAND function receives two parameters, "olderNode" and "newerNode." As described in the comment above in the pseudocode description, olderNode and newerNode represent two subtrees or subsets of the filter network that generate the same SQL. If both of these subtrees are complete trees (rather than being just part of a larger OR chain) then they can be merged. If they are complete trees, then the two nodes either have andParents or they are the first node in the network. If either of these nodes has an orParent, then they cannot be merged, because a node with an orParent cannot represent a complete sub-network (subtree).

Beginning at step 72, the MERGEAND function determines whether olderNode has an orParent. If so, then olderNode is not a complete tree or subset of the network, and therefore cannot be merged. Thus, the function returns at step 74 without merging olderNode and newerNode. If, however, olderNode has no orParent, then control passes to step 76, where the function determines whether newerNode has no andParents. If newerNode has no andparents, then newerNode cannot be a complete tree and therefore the function returns at 78 without merging the two nodes. If, however, olderNode has no orParent and newerNode has at least one andparent, then control passes to steps 80–90.

In steps 80–90 the filter nodes (and corresponding sub-networks) are merged. Beginning at step 80, newerNode's first andParent is identified, referred to as Parent. Then, at step 82, Parent's andChild is set equal to olderNode instead of newerNode. Parent is then added to olderNode's andParent list at step 84. Because the filter nodes are doubly linked in this manner, both steps 82 and 84 are utilized. At step 86, the function determines whether Parent represents the last of newerNode's andParents. If so, then the nodes have been merged and the function returns at 88. If not, however, then Parent becomes newerNode's next andParent, and steps 82–84 are repeated until all of newerNode's andParents have been merged into olderNode. Prior to returning at step 88, newerNode's deletion flag is set to "true," indicating that it has been merged by the visual optimization module 18.

FIG. 8 is a flowchart setting forth the preferred steps for visually optimizing a complex data filter according to the present invention. As noted above, this is the main program that corresponds to the visual optimization module 18. The two functions described previously, GENSQL and MERGEAND, are called by this main program. A pseudocode description of the visual optimization module 18 is set forth below.

Visual Optimization Module( )
Count the number of nodes NUMNODES (including duplicates) in the network
   Generate two parallel arrays of size NUMNODES: NODE[ ] and nodeSQL[ ]
   For I=1 to NUMNODES
     Let node be one of the nodes in the original network which has not already been put in the NODE array.
     Let NODE[I]=node
     Set node's deleted flag to FALSE
     Generate the string of SQL generated by node or any of his orChildren.
     This would be genSQL(node). Let nodeSQL[I]=this string
   End for
And now with those arrays of nodes and sql strings:
FOR I=1 to NUMNODES
   If NODE[I] is marked deleted, skip to next I
   For J=(I+1) to NUMNODES
     If NODE[J] is marked deleted, skip to next J
     If nodeSQL[I] equals nodeSQL[J]
     // this is potentially two identical trees
     MergeAND(NODE[I],NODE[J])//
   End if
   END for (J)
END for (I)

The visual optimization module 18 begins at step 102, where the parameter NUMNODES is set equal to the number of filter nodes in the filter network being visually optimized. A counter "I" is then set equal to 1 at step 104. Steps 106–114 generate two parallel arrays of size NUMNODES. The first array, NODE[ ] contains a list of the filter nodes in the network, and the second array, NODESQL[ ], contains the corresponding SQL for the sub-network at each filter node in the network.

Beginning then at step 106, the module determines whether the counter I is greater than NUMNODES. If so, then the two arrays have been generated and control passes to step 116. If not, however, then control passes to the rest of the array generating steps. At step 108 the array entry NODE[I] is set equal to the Ith node in the filter network. Then, at step 110, the deletion flag for NODE[I] is initialized to false. At step 112, the array entry NODESQL[I] is set equal to the generated SQL for the sub-network beginning at the Ith node of the filter network by calling the GENSQL function and passing the array entry NODE[I]. At step 114, the counter is incremented, and the module loops back to step 106. Steps 108–114 continue until the counter I is greater than NUMNODES, which indicates that the two arrays have been generated.

The remainder of the visual optimization algorithm compares each of the filter nodes to the other nodes in the network to determine if any pair of nodes generates the same SQL for the sub-network beginning at the respective node, and therefore may be merged using the MERGEAND function. Beginning at step 116, the counter I is reset to 1. At step 118, the module determines whether I is greater than NUMNODES. If I is greater than NUMNODES, then the entire filter network has been optimized and the main program ends at 120. If I is less than or equal to NUMNODES, however, then control passes to step 122.

At step 122, the module determines whether the deletion flag for the node being analyzed, NODE[I], is true. If so, then this node has already been merged or deleted and control passes to step 136, which increments the counter I so as to begin the analysis of the next filter node in the network. From step 136, the module loops back to step 118. If the deletion flag is false, however, then control passes to step 124. At this step (124) another counter J is set equal to the value of counter I plus 1. Thus, for example, if the third node in the filter network (NODE[3]) is being analyzed, then J is set equal to 4. Steps 126–134 then perform the SQL comparison analysis for NODE[I] against each of the remaining nodes in the filter network, i.e., compare node 3 to each of node 4 through node NUMNODES.

At step 126, the module determines if J is greater than NUMNODES. If so, then NODE[I] has been analyzed against the remaining nodes in the filter network, and control passes to step 136 where the I counter is incremented to analyze the next filter node. If J is less than or equal to NUMNODES, however, then control passes to steps 128–132, which perform the comparison analysis. At step 128, the module determines whether the deletion flag for NODE[J] is true. If so, then this node has already been merged or deleted, and control passes to step 134 where the J counter is incremented to point to the next remaining filter node. If the deletion flag for NODE[J] is false, however, then at step 130 the module determines whether NODESQL for NODE[I] is the same as NODESQL for NODE[J]. If the SQL is different, then control passes to step 134 and the J counter is incremented. If the SQL is the same, however, then at step 132 the MERGEAND function is called by passing the array entries NODE[I] and NODE[J] as older-Node and newerNode, respectively. As described above with reference to FIG. 7, this step then analyzes the two nodes and, if possible, merges the nodes and subsequent sub-networks thereby minimizing the number of displayed nodes in the filter network. Following step 132, the J counter is incremented to point to the next remaining node, and control loops back to step 126.

The result of executing the visual optimization module 18 is a filter network that is logically identical to the original network but may have fewer displayed nodes. The SQL derived from this network is identical to the SQL derived from the original network. The optimized network represents the exact same SQL as the original filter network, but with redundant sub-networks defined only once in the optimized network.

Certain filter networks may include structural inefficiencies that can be optimized by the present invention. Specifically, for any two nodes in the network, e.g., Node A and Node B, if both Nodes have the same andParents (i.e., the same inputs), and the SQL generated by Node A (and all its successor nodes in the network) is the same as the SQL generated by Node B (and all its successor nodes in the network), then one of Nodes A or B is redundant and can be eliminated from the network. The elimination step is different from the merging step because in the elimination step the logical structure of the underlying SQL query language is altered. This methodology of identifying and eliminating redundant nodes is accomplished using the SQL optimization module 20 of the present invention.

For example, consider the simple filter language:

WHERE 1=1 and (2=2 or 3=3 or 2=2 or 3=3)

FIG. 9A is a graphical representation of this simple query prior to structural optimization, and FIG. 9B is a graphical representation of the query after optimization. sing the structural optimization methodology described below, the redundant pairs of nodes "2=2" and "3=3" can be reduced to just one of each type of node. This simple example extends to much more complex structures and queries as will be apparent from the discussion below of the structural optimization module.

FIGS. 10–11 set forth flow charts that describe a software implementation of the SQL optimization module 20. FIG. 11 depicts the main program for optimizing the structure of the SQL clause. This program calls two sub-programs, the GENSQL program depicted in FIG. 6, and a sub-program that eliminates redundant SQL referred to as "MERGEOR".

FIG. 10 is a flowchart setting forth the preferred steps for eliminating redundant filter nodes according to the present invention—the MERGEOR function. Two parameters are passed to the MERGEOR function, olderNode and newerNode, which are the two filter nodes that have the same SQL. If these two nodes are in the same OR chain of the filter network, then one of them is logically redundant and can be eliminated from the display as well as the structure of the SQL, because the SQL of the eliminated node adds nothing of logical importance to the query. A pseudocode description of the MERGEOR function is set forth below.

Function MERGEOR(olderNode, newerNode)
Let node olderOldestOrParent=olderNode
While(olderOldestOrParent has an orParent)
   olderOldestOrParent=olderOldestOrParent's orParent
EndWhile
Let node potentiallyRedundantsOldestOrParent= newerNode
While(potentiallyRedundantsOldestOrParent has an or parent)
   potentiallyRedundantsOldestOrParent= potentiallyRedundantsOldestOrParent's orparent;
EndWhile
If(potentiallyRedundantsOldestOrParent is same node as olderOldestOrParent) then
   // if same node, we have redundancy here
   If the redundant newerNode had an andChild,
     remove newerNode from the child's andParent list because that parent
     is a duplicate of one of his other andParents
   Endif
   let orParentOfDupe=newerNode's orParent
   let orChildofDup=newerNode's orchild
   set orChild of orParentOfDupe to orChildOfDup
   set orParent of orChildofDup to orParentofDupe
   Set newerNode's "deleted" flag to true
Endif The MERGEOR function begins at step 142. Here, a pointer node referred to as olderOldestOrParent (OOOP) is set to olderNode. The function then traverses back up the orParent chain from olderNode to find the last orParent. At step 144, the function determines if OOOP has an orParent. If so, then OOOP is set to point to the orParent of the node pointed to by OOOP. If OOOP has no orParent, then the chain has been traversed and control passes to step 148.

Steps 148–152 perform the same orParent chain traversing steps as steps 142–146, but for the newerNode filter node. At step 148, a pointer node referred to as potentiallyRedundantsOldestOrParent (PROOP) is set to newerNode. The function then traverses back up the orParent chain from newerNode to find the last orParent in the chain. At step 150, the function determines if PROOP has an orParent. If so, then PROOP is set to point to the orParent of the node pointed to by PROOP. If PROOP has no orParent, then the chain has been traversed and control passes to step 154.

Step 154 determines if PROOP and OOOP are pointing to the same node. If so, then the nodes are redundant and one of them may be eliminated from the structure of the filter network. At step 156, the function determines whether redundant newerNode has an andchild. If so, then at step 158 newerNode is removed from the andChild's andParent list and control passes to step 160. If there is no andChild of newerNode, then control passes to step 160.

Steps 160–168 perform the function of eliminating the redundant newerNode from the filter network. This takes several steps because the filter network is maintained as a doubly linked list. At step 160, the pointer node orParentofDupe (DUPEOP) is set to the orParent of newerNode. At step 162 the pointer node orChildofDup (DUPEOC) is set to the orChild of newerNode. Then, at step 164, the orchild of DUPEOP is set to DUPEOC, and the orParent of DUPEOC is set to DUPEOP, thus completing the elimination of newerNode from the list of filter nodes. Finally, at step 168, newerNode's deletion flag is set to true, and the function returns at 170.

FIG. 11 is a flowchart setting forth the preferred steps for structurally optimizing the query language in a complex data filter according to the present invention. This is the main program that corresponds to the SQL optimization module 20. This program calls two other functions, the GENSQL function described above in FIG. 6, and the MERGEOR function described above in FIG. 10. A pseudocode description of the SQL optimization module 20 is set forth below.

SQL Optimization Module( )

Count the number of nodes NUMNODES (including duplicates) in the network

Generate two parallel arrays of size NUMNODES: NODE[], thisNodeOnSQL[]

For I=1 to NUMNODES

Let node be one of the nodes in the original network which has not already been put in the NODE array.

Let NODE[I]=node

Set node's deleted flag to FALSE

Generate the string of SQL generated by node's condition and all that logically follows that condition in the generated SQL. This would be the node's conditional expression "AND" the sql generated genSQL(the node's andChild). Let thisNodeOnSQL [I]=this string End for For I=1 to NUMNODES If NODE[I] is marked deleted, skip to next I For J=(I+1) to NUMNODES If NODE[J] is marked deleted, skip to next J if thisNodeOnSQL [I]=thisNodeOnSQL [J]

MergeOR(NODE[I],NODE[J])

End for (J)

End for (I)

The SQL optimization module begins at step 182, where the parameter NUMNODES is set equal to the number of filter nodes in the filter network being structurally optimized. A counter "I" is then set equal to 1 at step 184. Steps 190–200 generate two parallel arrays of size NUMNODES. The first array, NODE[ ] contains a list of the filter nodes in the network, and the second array, TNOSQL[ ] contains the corresponding SQL for each filter node in the network and all of the SQL for the node's successors in the filter network.

Beginning then at 186, the module determines whether the counter I is greater than NUMNODES. If so, then the two arrays have been generated and control passes to step 188. If not, however, then control passes to the remaining array generating steps. At step 190 the array entry NODE[I] is set equal to the Ith node in the filter network. Then, at step 192, the deletion flag for NODE[I] is set to false. At step 194, the array entry TNOSQL[I] is set equal to the conditional expression for NODE[I], i.e., the SQL associated with this node. Then, at step 196, the module determines if this node has any andChild. If not, then control passes to step 200. If the node has an andChild, then the array entry TNOSQL[I] is set equal to itself "ANDed" with the generated SQL for the node's andChild network, which is accomplished by passing the andChild node to the GENSQL function. In this manner, TNOSQL[] describes the SQL for particular node and all of its successor nodes in the filter network. Control then passes to step 200. At step 200, the counter is incremented, and the module loops back to step 186. Steps 190–200 continue until the counter I is greater than NUMNODES, which indicates that the two arrays have been generated.

The remainder of the structural optimization algorithm compares each of the filter nodes to the other nodes in the network to determine if any pair of nodes has the same entries in the array TNOSQL[], and therefore one of the nodes may be eliminated using the MERGEOR function. Beginning at step 188, the counter I is reset to 1. At step 202, the module determines whether I is greater than NUMNODES. If I is greater than NUMNODES, then the entire filter network has been structurally optimized and the main program ends at 204. If I is less than or equal to NUMNODES, however, then control passes to step 206.

At step 206, the module determines whether the deletion flag for the node being analyzed, NODE[I], is true. If so, then this node has already been eliminated and control passes to step 220, which increments the counter I so as to begin the analysis of the next filter node in the network. From step 220, the module loops back to step. 202. If the deletion flag is false, however, then control passes to step 208. At this step (208) another counter J is set equal to the value of counter I plus 1. Thus, for example, if the third node in the filter network (NODE[3]) is being analyzed, then J is set equal to 4. Steps 210–218 then perform the SQL comparison analysis for NODE[I] against each of the remaining nodes in the filter network.

At step 210 the module determines if J is greater than NUMNODES. If so, then NODE[I] has been analyzed against the remaining nodes in the filter network, and control passes to step 220 where the I counter is incremented to analyze the next filter node. If J is less than or equal to NUMNODES, however, then control passes to steps 212–216, which perform the comparison analysis. At step 212, the module determines whether the deletion flag for NODE[J] is true. If so, then this node has already been eliminated, and control passes to step 218 where the J counter is incremented to point to the next of the remaining filter nodes. If the deletion flag for NODE[J] is false, however, then at step 214 the module determines whether TNOSQL[I] for NODE[I] is the same as TNOSQL[J] for NODE[J]. If the TNOSQL[] strings are different, then control passes to step 218 and the J counter is incremented. If the TNOSQL[] strings are the same, however, then at step 216 the MERGEOR function is called by passing the array entries NODE[I] and NODE[J] as olderNode and newerNode, respectively. As described above with reference to FIG. 10, this step then eliminates the redundant filter node (NODE[J]) from the filter network. Following step 216, the J counter is incremented to point to the next of the remaining nodes, and control loops back to step 210.

The result of executing the structural optimization module on a query is that the raw SQL logic of the data filter is minimized by eliminating redundant nodes from the filter network. Although the SQL logic is altered by this algorithm, the logical data flow through the filter remains unchanged.

The preferred embodiment described with reference to the drawing figures is presented only to demonstrate an example of the invention. Additional, and/or alternative, embodiments of the invention would be apparent to one of ordinary skill in the art upon reading this disclosure.

What is claimed:

1. An optimization method for database queries, comprising the steps of:

(a) receiving a database query described by a query language logical structure;

(b) generating a filter network comprising a plurality of filter nodes, wherein the structure of the filter network corresponds to the logical structure of the query;

(c) optimizing the structure of the filter network by identifying pairs of redundant filter nodes in the filter network and deleting one of the redundant nodes in the pair; and (d) optimizing the display of the filter network by identifying similar sub-networks in the filter network and merging the sub-networks.

2. The method of claim 1, further comprising the step of:
displaying the optimized filter network.

3. The method of claim 1, further comprising the step of:
saving the optimized filter network to a data store.

4. The method of claim 1, wherein the generating step further comprises the steps of:
associating a filter node with each conditional expression in the database query; and
generating a filter node model for each filter node that includes one of the conditional expressions in the database query and a deletion flag that indicates whether the filter node has been merged or deleted in one of the optimization steps.

5. The method of claim 4, wherein the filter node model includes filter node pointers for maintaining the filter nodes as a doubly linked list.

6. The method of claim 5, wherein the filter node pointers include parent and child node pointers for coupling the filter node to one or more parent filter nodes and one or more child filter nodes.

7. The method of claim 6, wherein the parent node pointers include an AND parent node pointer and an OR parent node pointer.

8. The method of claim 6, wherein the child node pointers include an AND child node pointer and an OR child node pointer.

9. The method of claim 1, wherein the generating step further comprises the steps of:
providing an originating node that indicates the input of the filter network;
providing one or more terminating nodes that indicate the one or more outputs of the filter network; and
providing a plurality of link operators for coupling the originating node to the one or more terminating nodes through the plurality of filter nodes.

10. The method of claim 8, further comprising the steps of:
depicting the filter network according to a plumbing paradigm.

11. The method of claim 10, wherein the depicting step further comprises the steps of:
depicting the originating node as a funnel;
depicting the one or more terminating nodes as faucets;
depicting the plurality of filter nodes as boxes; and
depicting the link operators as pipes that couple the funnel to the faucets through the plurality of boxes.

12. The method of claim 11, further comprising the steps of:
configuring one of the link operators as an AND operator and depicting the AND link operator as a straight-line pipe.

13. The method of claim 11, further comprising the steps of:
configuring one of the link operators as an OR operator and depicting the OR link operator as a tee-line pipe.

14. The method of claim 1, wherein the receiving step further comprises the steps of:
providing a query input window for receiving a textual description of the query language logical structure.

15. The method of claim 1, wherein the receiving step further comprises the steps of:
providing a query input window for receiving a graphical description of the query language logical structure.

16. The method of claim 1, wherein the structural optimization step comprises the steps of:

identifying two filter nodes that, together with any succeeding nodes in the filter network, generate the same query language logical structure; and
deleting one of the two filter nodes from the filter network.

17. The method of claim 16, further comprising the steps of:
prior to deleting one of the two filter nodes, determining that the two filter nodes are logically coupled to a common parent node.

18. The method of claim 16, further comprising the step of:
generating the query language logical structure for each of the two filter nodes and any succeeding nodes in the filter network; and
storing the query language logical structure in an array.

19. The method of claim 16, further comprising the steps of:
repeating the identifying and deleting steps for each filter node in the filter network.

20. The method of claim 1, wherein the visual optimization step comprises the steps of:
identifying two filter sub-networks that generate the same query language logical structure;
determining whether the two filter sub-networks can be merged; and
if so, then merging the two filter sub-networks.

21. The method of claim 20, further comprising the steps of:
generating the query language logical structure for each of the two sub-networks; and
storing the query language logical structure in an array.

22. The method of claim 20, wherein the determining step comprises the steps of:
first determining whether the head filter node associated with one of the sub-networks is not logically ORed to a parent filter node;
second determining whether the head filter node associated with the other sub-network is not logically ANDed to a parent filter node; and
if these first and second determining steps are true, then determining that the two filter sub-networks can be merged.

23. The method of claim 20, further comprising the steps of:
repeating the identifying, determining and merging steps for each filter sub-network in the filter network.

24. A method of displaying a complex data filter, comprising the steps of:
generating a filter network model for the complex data filter, wherein the filter network model includes an originating node, one or more terminating nodes, and a plurality of filter nodes, wherein the originating node is coupled to the one or more terminating nodes through the plurality of filter nodes;
depicting the originating node as a funnel;
depicting the one or more terminating nodes as faucets;
depicting the filter nodes as boxes, wherein each box contains a conditional expression associated with the filter node;
depicting the logical couplings between originating node, the terminating node and the filter nodes using one or more types of pipes; and
displaying the filter network using the funnel, the faucets, the boxes, and the one or more types of pipes.

25. A system for optimizing database queries, comprising:
a query input module that receives a database query described by a query language logical structure;
a graphical interface module that generates a filter network comprising a plurality of filter nodes, wherein the structure of the filter network corresponds to the logical structure of the query;
a structural optimization module that optimizes the structure of the filter network; and
a visual optimization module that optimizes the display of the filter network.

26. The system of claim 25, further comprising:
a data store for saving the filter network.

27. The system of claim 25, further comprising:
a database containing a plurality of records; and
a query tool that applies the filter network to the plurality of records in the database.

28. The system of claim 25, further comprising:
a graphical display that displays the filter network.

29. The system of claim 25, wherein the structural optimization module optimizes the structure of the filter network by identifying pairs of redundant filter nodes in the filter network and deleting one of the redundant nodes in the pair.

30. The system of claim 25, wherein the visual optimization module optimizes the display of the filter network by identifying similar sub-networks in the filter network and merging the sub-networks.

31. A computer-readable medium encoded with program instructions for optimizing and displaying database queries, wherein the program instructions enable the steps of:
receiving a database query;
generating a filter network comprising a plurality of filter nodes, wherein the structure of the filter network corresponds to the logical structure of the query;
optimizing the structure of the filter network by identifying pairs of redundant filter nodes in the filter network and deleting one of the redundant nodes in the pair;
optimizing the display of the filter network by identifying similar sub-networks in the filter network and merging the sub-networks; and
displaying the optimized filter network.

32. A method for optimizing the display of complex data filters, comprising the steps of:
receiving a complex data filter including a plurality of filter nodes organized into a filter network, wherein each filter node corresponds to a conditional expression in the complex data filter;
generating a data model for each of the filter nodes in the filter network, wherein the data model includes a conditional expression for each filter node and a corresponding flag that indicates whether or not the node has been optimized; and
optimizing the display of the filter network by:
identifying similar sub-networks in the filter network;
merging the similar sub-networks; and
setting the flag for one of the filter nodes in the merged sub-network to indicate that the node has been optimized.

33. A system for optimizing complex data filter queries, comprising:
means for receiving a query;
means for generating a filter network corresponding to the logical structure of the query, wherein the filter network includes a plurality of filter nodes that each correspond to one conditional expression in the query;
means for optimizing the structure of the filter network; and
means for optimizing the display of the filter network.

34. A visualization optimization method for database queries, comprising the steps of:
receiving a database query described by a query language logical structure;
generating a filter network comprising a plurality of filter nodes, wherein the structure of the filter network corresponds to the logical structure of the query;
optimizing the structure of the filter network by identifying pairs of redundant filter nodes in the filter network and deleting one of the redundant nodes in the pair;
optimizing the display of the filter-network by identifying similar sub-networks in the filter network and merging the sub-networks;
wherein the display of the filter network is optimized by steps comprising:
identifying two filter sub-networks that generate the same query language logical structure;
determining whether the two filter sub-networks can be merged; and
if so, then merging the two filter sub-networks;
wherein the determining step comprises the steps of:
(a) determining whether the head filter node associated with one-of the sub-networks is not logically ORed to a parent filter node;
(b) determining whether the head filter node associated with the other sub-network is not logically ANDed to a parent filter node; and
if the determining steps of (a) and (b) are true, then determining that the two filter sub-networks can be merged.

35. A visualization optimization method for viewing conditions associated with base queries, comprising the steps of:
receiving a database query described by a query language logical structure;
generating a filter network comprising a plurality of filter nodes, wherein the structure of the filter network corresponds to the logical structure of the query;
optimizing the structure of the filter network by identifying pairs of redundant filter nodes the filter network and deleting one of the redundant nodes in the pair;
optimizing display of the filter network by identifying similar sub-networks in the filter work and merging the sub-networks; and
displaying on a graphical display the optimized filter network.

* * * * *

UNITED STATES PATENT AND TRADEMARK OFFICE
CERTIFICATE OF CORRECTION

PATENT NO.    : 6,470,335 B1                                     Page 1 of 1
DATED         : October 22, 2002
INVENTOR(S)   : Marusak It is certified that error appears in the above-identified patent and that said Letters Patent is hereby corrected as shown below:

Column 20,
Line 21, delete "filter-network" and insert -- filter network --.
Line 33, delete "one-of" and insert -- one of --.
Line 42, delete "base" and insert -- database --.
Line 53, delete "work" and insert -- network --.

Signed and Sealed this

Eighteenth Day of February, 2003

JAMES E. ROGAN
*Director of the United States Patent and Trademark Office*